April 27, 1926.                                              1,582,316
R. R. TEETOR
TOOL FOR COMPRESSING PISTON RINGS
Filed April 12, 1924
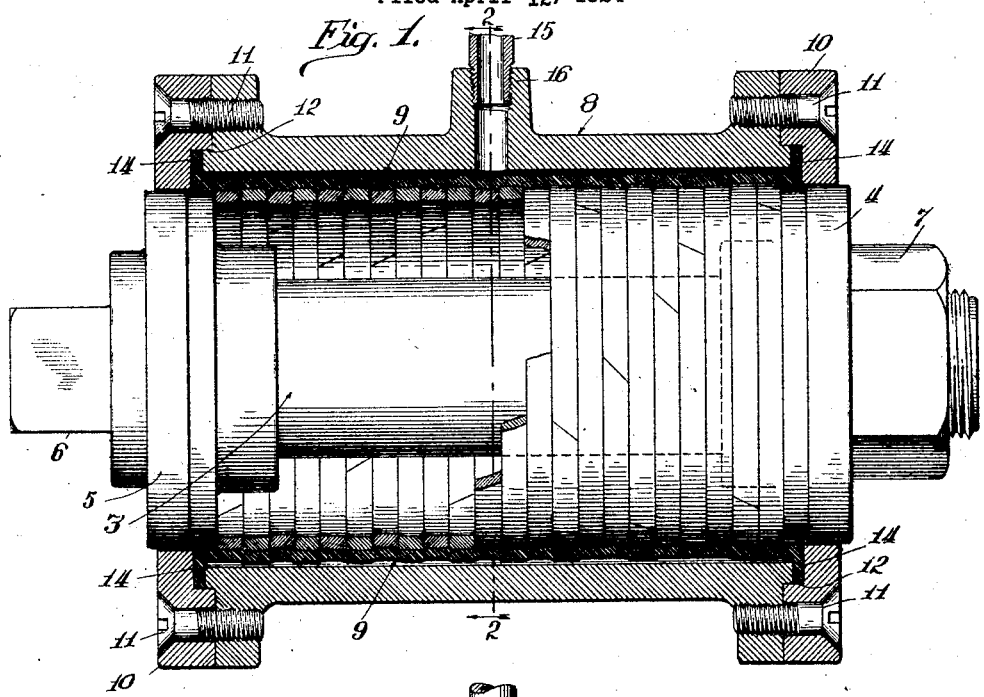

Patented Apr. 27, 1926.

1,582,316

UNITED STATES PATENT OFFICE.

RALPH R. TEETOR, OF HAGERSTOWN, INDIANA, ASSIGNOR TO INDIANA PISTON RING COMPANY, OF HAGERSTOWN, INDIANA, A CORPORATION OF INDIANA.

TOOL FOR COMPRESSING PISTON RINGS.

Application filed April 12, 1924. Serial No. 706,045.

*To all whom it may concern:*

Be it known that I, RALPH R. TEETOR, a citizen of the United States, residing at Hagerstown, in the county of Wayne and State of Indiana, have invented certain new and useful Improvements in Tools for Compressing Piston Rings, of which the following is a specification.

My invention relates to apparatus for compressing objects and is of particular service for effecting the closure of the gaps, which are formed in piston rings after they have been cast, in order to prepare them for the finishing of their exterior circumferential surfaces. I have shown and described an apparatus or tool of this class in my U. S. Patent No. 1,454,350. The principal objects of my invention are to improve, cheapen and simplify the construction of the apparatus or tool and more accurately align or center the piston rings, as will be hereinafter more fully pointed out.

Referring to the drawings, Fig. 1 is a longitudinal sectional view through a tool embodying my invention, and shows the compressor and the arbor and piston rings in place therein, some of the rings being shown in section, and Fig. 2 is a sectional view taken on the line 2—2 of Fig. 1.

The device for carrying the piston rings comprises an arbor 3, having its ends suitably formed for mounting between the head and tail stocks of a lathe, and circular end plates or heads 4 and 5 mounted on the arbor. The arbor has a head 6 at one end and a nut 7 in threaded connection with the other end. The piston rings, after being split or parted by removal of the proper amount of metal at the joints, are placed upon the arbor between the end plates 4 and 5 and the nut 7 is screwed upon the threaded end of the arbor to move the end plate 4 toward the end plate 5 just sufficiently to clamp the rings in position between the plates, but not so tightly as to prevent the rings from having imparted to them a partial ring-closing adjustment in a centering shell or cylinder such as shown and described in my aforesaid patent. As there described, the shell comprises two half-cylindrical parts hinged together, and when the sections are closed around the rings on the arbor the rings are contracted to just partially close the gaps at the joints. The action of the centering shell is such that the rings are properly centered on the arbor 3 and the outer peripheries of the rings are of substantially the same diameter so that they form, in effect, one continuous smooth cylindrical surface. While the rings are in the centering shell, the nut 7 is tightened to firmly clamp the rings between the plates 4 and 5, the rings being thus retained in their partially contracted condition when the shell is removed. While thus held in assembly they are slipped into the compressor of my present invention.

As illustrated in the drawings, the compressor comprises an outer cylindrical casing or shell 8, preferably formed of metal, a single-walled flexible tube 9, preferably of rubber, and end rings or flanges 10, secured to the ends of the casing 8 by means of screws 11. The rings 10 and the ends of the casing 8 are provided with contacting annular shoulders 12 which assist in properly centering the rings 10 on the casing 8. The ends of the rubber tube 9 are turned outwardly to form radial flanges 14 which are firmly clamped between the rings 10 and the ends of the cylinder 8, as illustrated in Fig. 1. Thus the rubber tube 9 and casing 8 afford an air-tight compression or expansion chamber between them. An air hose or pipe 15 is connected to a nipple 16, preferably integral with the casing 8, and the opposite end of the pipe 15 is connected to a pressure tank or air pump (not shown), while the pipe 15 is provided with a two-way valve (not shown) to place the expansion chamber of the compressor in communication with the tank or pump for inflation of the tube 9 or in communication with the atmosphere for deflation of the tube 9, as, for example, fully shown and described in my aforesaid patent. The arbor 3 and the centered rings thereon are slipped into the compressor while the tube 9 is deflated. It will be observed that each plate 4 and 5 has two circular portions of different diameters, and that the larger diametered portions fit closely within the rings 10 for the purpose of aiding in properly centering the arbor and the rings in the compressor. The rings are clamped between the portions of the plates 4 and 5 of smaller diameter so that the plates do not interfere with the proper closing action of the end rings in contact therewith when the tube 9 is inflated.

When the piston rings are in place in the compressor, air is admitted to the chamber under more than sufficient pressure to completely close all of the gaps at the joints of the rings, which were only partially closed to varying extents in the centering shell. The nut 7 is then loosened to permit the rubber tube 9 to close all of the piston ring gaps, by the pressure radially and inwardly exerted upon the rings in sufficient degree to secure this result. Fig. 1 illustrates the apparatus after the tube has been inflated. The rings, whose gaps are now completely closed, are of different diameters and are removed from the compressor after the nut 7 has been tightened to firmly clamp the rings in their closed condition between the end plates 4 and 5 and the tube 9 has been deflated. The arbor and rings are then placed in a lathe and the rings are turned to a uniform external diameter, whereafter the rings are demounted from their supporting arbor.

It will be observed that in my present invention I use a one-walled flexible tube 9 and clamp its out-turned ends between the ends of the rigid casing 8 and the end rings 10 secured thereto. The expansion chamber or space between the casing 8 and the flexible tube is very narrow. The air pipe 15 is directly connected to the nipple 16, rather than to a stem attached to a two-walled tube as in my previous construction. It will now be obvious that my present invention affords an improved, cheap and simple construction.

I claim:

1. In a tool for exerting closing pressure upon piston rings, the combination with mounting means for clamping the piston rings in assembly, and a rigid cylinder, a flexible single-walled tube within the cylinder forming an expansion chamber with the cylinder, and means for clamping the ends of the tube to the ends of the cylinder.

2. In a tool for exerting closing pressure upon piston rings, the combination with mounting means for clamping the piston rings in assembly, and a cylinder, a flexible single-walled tube within the cylinder forming an air chamber with the cylinder, and detachable end rings for clamping the ends of the tube to the ends of the cylinder.

3. In a tool for exerting closing pressure upon piston rings, the combination with mounting means for clamping the piston rings in assembly, and a cylinder having an air opening, an air pipe directly attached to said opening, a flexible single-walled tube within the cylinder forming an air chamber with the cylinder, and means for clamping the ends of the tube to the cylinder.

4. In a tool for exerting closing pressure upon piston rings, the combination with a mounting comprising two end plates, each having two portions of different diameters, for clamping the piston rings between the portions of smaller diameter, a rigid cylinder, a flexible single-walled tube forming an air chamber with the cylinder, and end rings for clamping the ends of the tube to the ends of the cylinder and having an interior diameter of substantially the same size as the larger diametered portions of the end plates in order to aid in centering the arbor and rings in the cylinder.

5. In a tool for exerting closing pressure upon piston rings, the combination with a mounting for piston rings comprising an arbor carrying end plates each having portions of different diameters, the rings being clamped between the portions of smaller diameter, and a cylinder provided with a flexible tube therein affording an expansion chamber and said cylinder having inwardly directed flanges at its ends having an interior diameter substantially the same as the diameter of the larger diametered portions of said end plates to aid in centering the rings and arbor in the cylinder.

RALPH R. TEETOR.